United States Patent [19]

Willrett et al.

[11] Patent Number: 5,577,198
[45] Date of Patent: Nov. 19, 1996

[54] TEST METHOD AS WELL AS A CONVERTER, A TEST SET, AND A TEST-PROGRAM MODULE THEREFOR

[75] Inventors: Ursel Willrett, Ditzingen; Konrad Schaupp, Gäufelden, both of Germany

[73] Assignee: Alcatel SEL A.G., Stuttgart, Germany

[21] Appl. No.: 507,111

[22] Filed: Jul. 26, 1995

[30] Foreign Application Priority Data

Jul. 28, 1994 [DE] Germany .......................... 44 26 740.1

[51] Int. Cl.⁶ ...................................................... G06F 11/00
[52] U.S. Cl. ....................................................... 395/183.09
[58] Field of Search ........................ 395/183.09, 183.08, 395/183.04, 183.03, 183.07; 371/20.1, 20.4, 20.5

[56] References Cited

U.S. PATENT DOCUMENTS

| | | | |
|---|---|---|---|
| 4,247,941 | 1/1981 | Raymond | 371/15 |
| 4,718,064 | 1/1988 | Edwards et al. | 395/183.04 |
| 5,146,460 | 9/1992 | Ackerman et al. | 395/183.09 |
| 5,271,000 | 12/1993 | Engberson et al. | 371/20.1 |
| 5,289,474 | 2/1994 | Purcell et al. | 371/20.5 |
| 5,345,450 | 9/1994 | Saw et al. | 395/183.09 |
| 5,353,289 | 10/1994 | Ohkawa | 395/183.09 |
| 5,394,540 | 2/1995 | Barrington et al. | 395/500 |
| 5,440,697 | 8/1995 | Boegel et al. | 395/183.09 |
| 5,477,544 | 12/1995 | Botelho | 371/20.1 |

FOREIGN PATENT DOCUMENTS

| | | | |
|---|---|---|---|
| 0589576 | 3/1994 | European Pat. Off. | H04L 12/26 |
| 4132327 | 4/1993 | Germany | H04Q 1/20 |
| 4243387 | 6/1994 | Germany | H04L 12/26 |

OTHER PUBLICATIONS

"Siemens K1197 Protocol Tester", Siemens Technical Bulletin E86060-T6052-A661-A5, Siemens AG, Munich, Germany, 1993.

*Primary Examiner*—Robert W. Beausoliel, Jr.
*Assistant Examiner*—Joseph E. Palys
*Attorney, Agent, or Firm*—Ware, Fressola, Van Der Sluys & Adolphson

[57] ABSTRACT

To test a first device, the latter is connected to a simulator which simulates at least one second device according to a test case stored in a second data set. The simulator sends messages to the first device according to the test case, receives reply messages from the first device, and stores these reply messages in the second data set. According to the invention, the test is stored in advance as an abstract test scenario in a first data set. To generate the test case, the first data set is then mapped to the second data set by means of message-structure data and by insertion of basic-setting data. For evaluation, the second data set is mapped back to the first data set by data reduction.

14 Claims, 3 Drawing Sheets

TEST METHOD AS WELL AS A CONVERTER, A TEST SET, AND A TEST-PROGRAM MODULE THEREFOR

TECHNICAL FIELD

The present invention relates to a method of testing at least one first device as set forth in the preamble of claim 1, to a converter as set forth in the preamble of claim 9, to a test set for testing at least one first device as set forth in the preamble of claim 11, and to a program module for a converter for testing at least one first device as set forth in the preamble of claim 13.

BACKGROUND OF THE INVENTION

Particularly in communications, testing newly developed products, such as exchanges, mobile-radio components (MSC, BS), or components for distributed systems (router, bridge), is becoming increasingly difficult and complex. This results from the fact that the exchange of information to be tested is governed by increasingly complex communications protocols, which are generally assigned to different layers of communciations functions. Such tests are carried out with so-called protocol testers.

The invention starts from a protocol tester as is known from a 1993 publication by Siemens AG entitled "K1197 Protocol Tester", which is obtainable under Order No. E86060-T6052-A661-A5. The protocol tester described there is designed to be connected to a test object, such as an exchange, and simulates one or two other network components, e.g., also an exchange. According to a test procedure, also called "test case", the protocol tester sends message to, and receives reply messages from, the exchange, thus simulating a particular communication situation. The test procedure is present in the form of a state machine and is generated by the tester in a programming language. The reply message received from the exchange can be output, for example, in hexadecimal or numerical form or by means of an analysis program in various other representations.

The disadvantage of a test method using such a test set is that the generation of a test case is very time-consuming, since the programming of a test case is complicated and generally requires several different utility programs. The evaluation of the test result also takes a very long time.

DISCLOSURE OF INVENTION

The object of the invention is to reduce the time needed to test a device.

According to a first aspect of the present invention, a method of testing at least one first device wherein the first device is connected to a simulator which simulates at least one second device according to a test case stored in a second data set, and wherein the simulator sends messages to the first device according to the test case, receives reply messages from the first device, and stores them in the second data set, is characterized in that a test is stored in advance as an abstract test scenario in a first data set, that to generate the test case, the first data set is mapped to the second data set by means of message-structure data and by insertion of basic-setting data, and that for evaluation, the second data set is mapped back to the first data set by data reduction.

According to a second aspect of the present invention, a converter for testing at least one first device by means of a simulator designed to simulate at least one second device according to a test case stored in a second data set is characterized in that the converter is provided with a memory device, with a mapping device, and with an operating facility for entering data into the memory device and extracting data therefrom, that the memory device contains a first data set about an abstract test scenario, a basic-setting data set, and a message-structure data set, and that the mapping device is designed to map, in response to a first control instruction, the first data set to the second data set by means of data from the message-structure data set and by insertion of data from the basic-setting data set, and to map, in response to a second control instruction, the second data set back to the first data set by data reduction.

According to a third aspect of the present invention, a test set for testing at least one first device connected thereto comprises a simulator designed to simulate at least one second device according to a test case stored in a second data set, wherein the test set further comprises a converter which is provided with a memory device, with a mapping device, and with an operating facility for entering data into the memory device and extracting data therefrom, that the memory device contains a first data set about an abstract test scenario, a basic-setting data set, and a message-structure data set, and that the mapping device is designed to map, in response to a first control instruction, the first data set to the second data set by means of data from the message-structure data set and by insertion of data from the basic-setting data set, and to map, in response to a second control instruction, the second data set back to the first data set by data reduction.

According to a fourth aspect of the present invention, a program module for a converter for testing at least one first device by means of a simulator designed to simulate at least one second device according to a test case stored in a second data set, said program module containing a plurality of control instructions, is characterized in that the control instructions are arranged to control the sequence of operations in the converter in such a way that in response to a first request, a first data set in which a test is stored as an abstract test scenario is mapped to the second data set by means of message-structure data and by insertion of basic-setting data, and that in response to a second request, the second data set is mapped back to the first data set by data reduction.

The basic idea of the invention is that an abstract test scenario and a test case, which controls the test, are alternately mapped to each other by means of basic-setting data and message-structure data. By combining these data with the test scenario a sort of variable filter function is implemented which allows the tester to enter his test wish in a form reduced to the necessary information and to obtain the test result in the same form. This makes it possible to generate a test case faster and with only one utility program, and to evaluate the test result faster.

Another advantage of the invention is that interactive testing is possible. Since the test case being executed can be mapped to the abstract scenario at any time, the current test situation can be determined, and intervention in the test case, i.e., in the test procedure, is then possible by changing the test scenario.

A further advantage is that as a result of the mapping, fewer errors are contained in the test cases, and that the errors still contained can be detected and corrected more quickly.

A still further advantage is that the abstract test scenario is independent of the simulator used. Thus, the tester can create and evaluate a test independently of the form of the test procedure of the specific simulator used.

These and other objects, features and advantages of the present invention will become more apparent in light of the detailed description of a best mode embodiment thereof, as illustrated in the accompanying drawing.

BEST MODE FOR CARRYING OUT THE INVENTION

The embodiment explains the use of the method according to the invention in a test arrangement consisting of a mobile-radio network component and a test set according to the invention, which comprises a converter according to the invention. The converter according to the invention is controlled by a program module according to the invention.

A network component is chosen here as a test object only by way of example; any other device can be used which can be tested by exchanging messages.

Such messages are information which corresponds to one or more protocols, particularly interface protocols. It is also possible, however, that no such protocols are defined. What is important that the reception of this information initiates predetermined responses of the test object, which then have a direct or indirect effect on the reply messages of the test object. By evaluating these reply messages, it is possible to check the correct response of the device.

Figure 1:
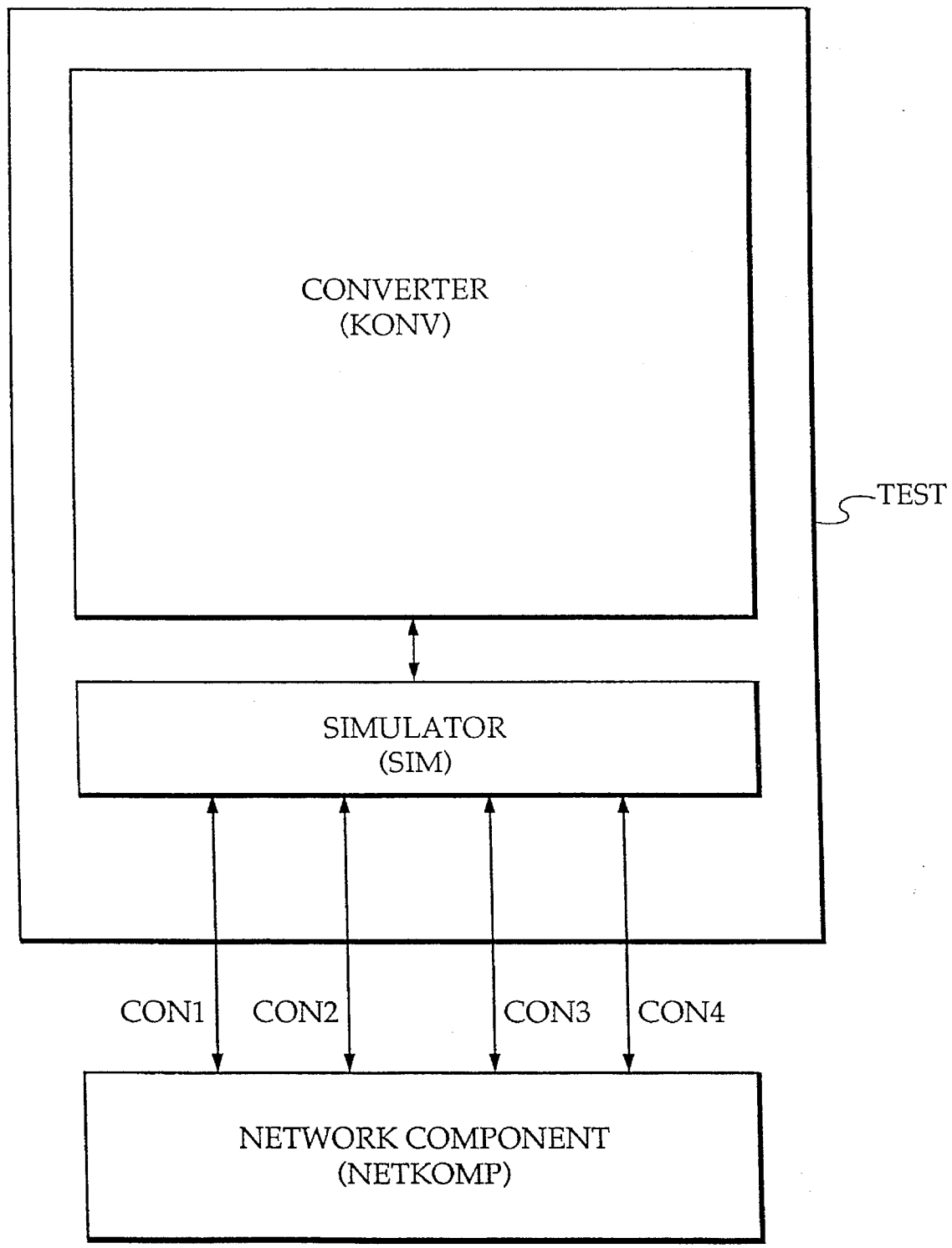
FIG. 1 is a block diagram of a test set according to the invention which is connected to a network component.

FIG. 1 shows a test set TEST and a network component NETKOMP which are connected with one another via four links CON1 to CON4.

The network component NETKOMP is a component for a mobile-radio network, e.g., a mobile switching center (MSC). It could also be any other component of a communications network.

The test set TEST is constituted by one or more interconnected computers which are equipped with suitable peripheral devices and are controlled by program modules. Such program modules consist of one or more data carriers on which control instructions are stored. Data carriers are, for example, floppy disks, hard disks, memory chips, or other storage media.

Each of the links CON1 to CON4 is connected to an interface of the network component NETKOMP which normally serves to provide the connection with other network components. Such other network components would be, for example, a base station (BS), a home location register (HLR), or a gateway mobile switching center (GMSC).

The network component NETKOMP may also be connected to the test set TEST by a different number of links. This depends in particular on the type of network component NETKOMP to be tested and on the degree to which the test set TEST is equipped.

The test set TEST sends messages to and receives reply messages from the network component NETKOMP over the links CON1 to CON4. The test set TEST thus simulates four fictitious network components which are connected to the network component NETKOMP via the links CON1, CON2, CON3, and CON4, respectively. From the reply messages received from the network component NET-KOMP it can be determined whether the latter is functioning correctly.

The test set TEST comprises a converter KONV and a simulator SIM. The simulator SIM exchanges data with the network component NETKOMP and the converter CONV.

The simulator SIM is controlled by a test case. This test case contains all information required for a test operation in a form executable by the simulator SIM. Such a test case consists, for example, of a number of programs which describe the test operation in the form of a state machine. The case comprises a very large amount of information, since it must describe all details of the communication, which extends over several protocol layers.

It is also possible to construct the simulator SIM from two or more subsimulators. Each of these subsimulators would contain a test subcase and simulate one or more network components for the network component NETKOMP.

With the converter KONV, the test case is generated from an abstract scenario, and the reply messages are mapped to the abstract test scenario. The abstract test scenario describes the test at an abstract level at which only the test-specific information is given, and thus comprises only a small amount of information. The information to be inserted and filtered out for the generation of the test case and for the mapping of the abstract test scenario, respectively, is inserted and filtered out by the converter.

The test is thus generated as an abstract test scenario by the tester and mapped to the test case by the converter KONV, and is then executed on the simulator SIM. The response of the network component is mapped back to the test scenario. This enables the tester to immediately detect any test-specific malfunction of the network component.

The construction of the test set TEST will now be explained in more detail with reference to FIG. 2.

Figure 2:
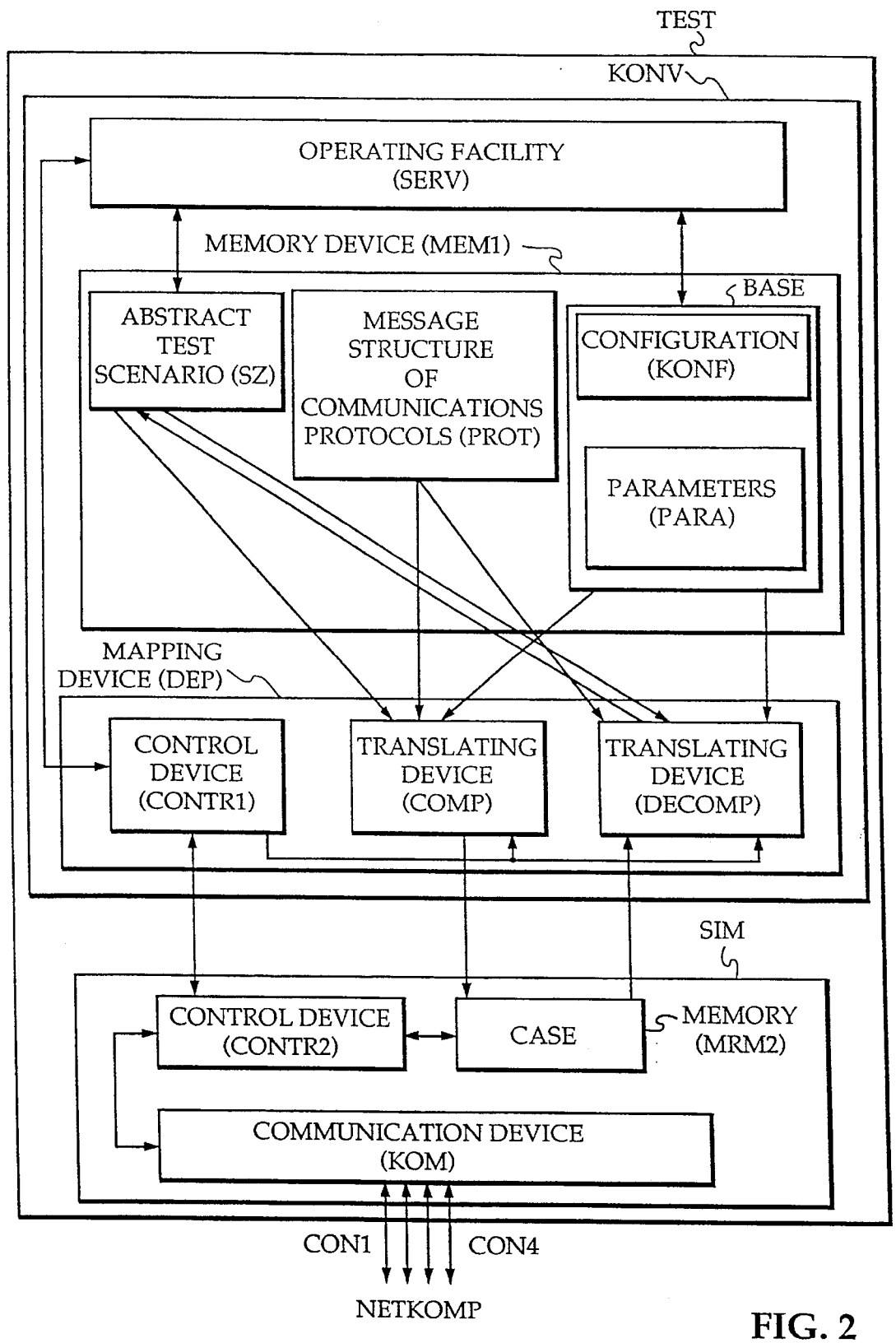
FIG. 2 is a detailed block diagram of the test set of FIG. 1.

FIG. 2 shows the test set TEST, comprising the converter KONV and the simulator SIM.

The simulator SIM exchanges data with the converter KONV and the network component NETKOMP.

The simulator SIM contains a control device CONTR2, a memory device MEM2, and a communication device KOM. The control device CONTR2 exchanges data with the converter KONV, with the memory device MEM2, and with the communication device KOM. The communication device KOM exchanges messages with the network component NETKOMP over the links CON1 to CON4.

The communication device KOM provides the communication services required to exchange information with the network component NETKOMP. Such communication services are, for example, the provision of the physical interfaces and the processing of the respective interface protocols for the links CON1 to CON4.

The communication device KOM may include an arbitrary number of devices which provide such services for different interfaces. Such devices could also be designed as replaceable modules.

The memory device MEM2 holds a data set CASE which contains the test case. Also stored in the data set CASE are the reply messages received from the network component NETKOMP.

The data set CASE may also contain further information, such as information as to which reply messages are to be expected for which state of the network component to be simulated.

The control device CONTR2 controls the sequence of operations in the simulator SIM. It sends messages via the communication device KOM to the network component NETKOMP according to the test case stored in the data set CASE, thus simulating four fictitious network components. It then stores the reply messages in the data set CASE. In addition, the control device CONTR2 exchanges control instructions with the converter KONV. This enables the converter KONV to influence the sequence of operations in the simulator SIM.

This exchange of control instructions between the control device CONTR2 and the converter KONV could also be dispensed with. This is appropriate, for example, if the data exchange between the simulator SIM and the converter KONV takes place not via a data link, but via data carriers.

Thus, the sequence of operations in the simulator SIM is as follows:

Data about a test case is loaded from the converter KONV into the data set CASE in the memory device MEM2. The control device CONTR2 sends messages via the communication device KOM to the network component NETKOMP in accordance with this test case. It receives reply messages from the network component NETKOMP and stores them in the data set CASE. If a corresponding control instruction is received from the converter KONV, or if, for example, such reply messages do not match the reply messages stored in the data set CASE, the control device CONTR2 causes the data set CASE to be sent to the converter KONV.

It is also possible to send only parts of the data set CASE to the converter KONV, e.g., only the reply messages from the network component NETKOMP.

The converter KONV comprises an operating facility SERV, a memory device MEM1, and a mapping device DEP. The operating facility SERV exchanges data with the memory device MEM1 and the mapping device DEP. The mapping device DEP exchanges data with the memory device MEM1 and the simulator SIM.

The memory device MEM1 contains three data sets SZ, PROT, and BASE.

The data set SZ contains the abstract test scenario. The test is described by the abstract test scenario, e.g., by plotting the messages to be exchanged between the network component NETKOMP and the four fictitious network components against time. Only the designations of the messages are stored at a freely selectable communication level. The large number of parameters and submessages or message sequences required to convert such an abstract message are not specified. If the specific test situation is aimed at such a parameter or such a submessage, the latter can be additionally noted at the respective abstract message.

The data message PROT contains the message structure of the protocols used by the network component NETKOMP, particularly the message structure of the communications protocols. It may also contain the message structure of further protocols which are not used by the network component NETKOMP. This is particularly appropriate if the test set TEST serves to test different network components which use different protocols.

The data set BASE contains two files KONF and PARA.

The file KONF contains the configuration which includes the network component NETKOMP. The configuration describes, for example, which other network components are connected to the network component NETKOMP and which network components are simulated by the test set TEST.

The file PARA contains a great number of parameters which describe the network component NETKOMP, the network components to be simulated by the test set TEST, and the communications environment of these network components.

The operating facility SERV provides a graphical user interface which allows the user of the test set TEST to read data from or enter data into the data sets SZ and BASE of the memory device MEM1. In addition, the operating facility SERV makes it possible for the user of the test set TEST to send control instructions to or receive data from the mapping device DEP.

It is also possible that the operating facility SERV has no graphical user interface capability and only provides simple input and output functions, and that no control instructions can be given from the operating facility SERV to the mapping device DEP or no data can be received from the latter.

It is also possible that the operating facility SERV can enter data into or read data from the data set PROT. In particular, it is possible that data is entered into the data set PROT from data carriers, such as floppy disks or data sheets, by means of a specific reading device.

The mapping device DEP maps the data sets SZ and CASE to each other. It comprises a control device CONTR1 and two translating devices COMP and DECOMP.

The control device CONTR1 exchanges data with the operating facility SERV and with the control device CONTR2 of the simulator SIM, and sends control instructions to the translating devices COMP and DECOMP. The translating device COMP receives data from the data sets SZ, PROT, and BASE of the memory device MEM1, and sends data to the memory device MEM2 of the simulator SIM. The translating device DECOMP reads data from the data sets SZ, PROT, and BASE, and enters data into the data set SZ. In addition, it receives data from the memory device MEM2 of the simulator SIM.

In response to a control instruction from the control unit CONTR1, the translating device COMP writes data about the abstract test scenario from the data set SZ into the memory device MEM2. By means of the message structures stored in the data set PROT, the translating device COMP supplements the data with basic-setting data, which it reads from the data set BASE. The basic-setting data thus provide the "details" of the abstract test scenario. By means of further data from the data set BASE, the detailed test scenario thus obtained is then translated into a form which corresponds to the form required for a test case by the simulator SIM. The test case so generated is then sent to the simulator SIM, where it is entered into the data set CASE in the memory device MEM2.

It is also possible to provide a separate device for translating the detailed test scenario into the test case. In particular, different such devices may be provided which carry out the translation into the test cases for different simulators that require different forms of the test case. Means for switching between such device could be provided, or the devices could be designed as replaceable modules.

The translating device DECOMP performs the mapping back in a similar manner. In response to a control instruction from the control device CONTR1, it reads the data set CASE from the simulator SIM, generates from the data set CASE a detailed test scenario, and maps the latter to an abstract test scenario by means of data from the data sets SZ, PROT, and BASE. This mapped-back, abstract test scenario is then entered in the data set SZ.

A possible mapping procedure which is carried out by the translating devices COMP and DECOMP will now be explained in more detail with the aid of FIG. 3.

Figure 3:
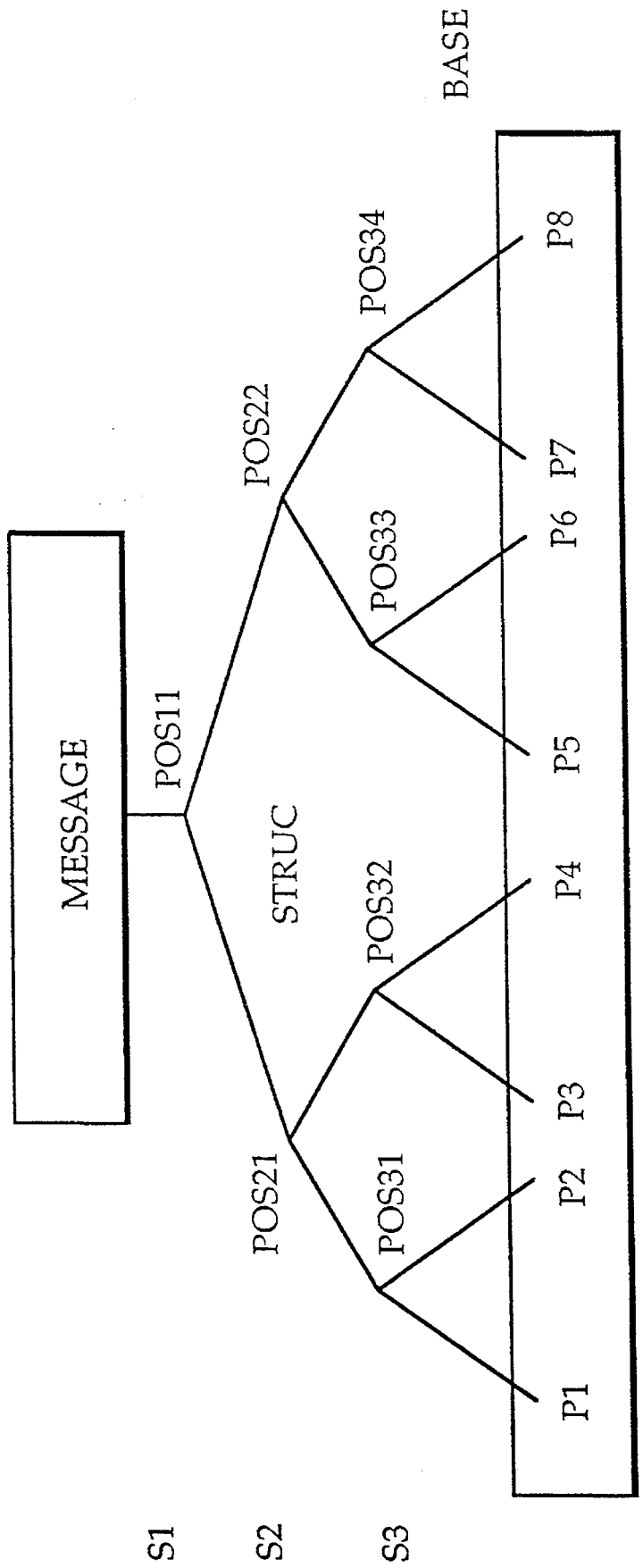
FIG. 3 is a symbolic representation of a message structure for the test set of FIGS. 1 and 2.

FIG. 3 shows a message structure STRUC, a message MESSAGE, and eight parameters P1 to P8, which are stored in the data set BASE.

The message MESSAGE is an abstract message which is used in the test scenario stored in the data set SZ.

The message structure STRUC has the form of a tree structure with three levels S1 to S3, and assigns the parameters P1 to P8 to the message MESSAGE.

The message structure has a number of structure positions POS11 to POS34, with structure position POS11 located at the first level S1, structure positions POS21 and POS22 at the second level S2, and structure positions POS31 to POS34 at the third level S3. The structure positions POS1 to POS22 of the two upper levels S1 and S2 are assigned structure positions of the level located therebelow, and the structure positions POS31 to POS34 of the lowest level S3 are assigned parameters from the data set BASE.

Each of the structure positions POS11 to POS34 stands for an abstract message or an abstract parameter, such messages and parameters belonging to different abstraction levels.

It is also possible to organize the message structure STRUC in a different number of levels or to use a structure other than the tree structure.

For mapping the abstract test scenario to the detailed test scenario, the abstract messages are mapped to message-structure positions. The message MESSAGE is thus mapped to structure position POS11, whereby the parameters P1 to P8 are automatically assigned to it. Another abstract message could be mapped to structure position POS21, for example, whereby the parameters P1 to P4 would be assigned to it.

Since abstract messages or parameters which refer to different levels of the respective message structure can be used in the abstract test scenario, the latter can belong to locally different abstraction levels. This allows a tester to generate the abstract test scenario, which is stored in the data set SZ, in a locally selectable abstraction depth by means of the operating facility SERV.

The detailed test scenario is mapped back to the abstract test scenario as follows:

By means of the original abstract test scenario, the assignment of groups of parameters to structure positions is determined. If the original assignment is no longer possible because, for example, a reply message differing from the predicted reply message was sent by the network component NETKOMP, the deviating structure positions will be determined. A mapped-back abstract test scenario is thus obtained which differs in abstraction depth from the original test scenario only if differences exist between these scenarios.

It is also possible to assign groups of parameters to structure positions of the same level and thus obtain an abstract test scenario with a uniform abstraction level.

The control device CONTR1 controls the mapping and the mapping back by the translating devices COMP and DECOMP, respectively, as shown in FIG. 2. In response to a request from the operating facility SERV, the control device CONTR1 sends to the translating device COMP and to the control device CONTR2 of the simulator SIM control instructions which cause the data set SZ to be mapped to the data set CASE. In response to another request from the operating facility SERV, the control device CONTR1 sends to the translating device DECOMP and to the control device CONTR2 of the simulator SIM control instructions which cause the data set CASE to be mapped back to the data set SZ.

The operation of the converter KONV is thus as follows:

An abstract test scenario is generated in the data set SZ via the graphical user interface of the operating facility SERV, and stored in the data set SZ. In response to a request, the control device CONTR1 sends control instructions to the translating device COMP, which then translates the abstract test scenario from the data set SZ into a test case in the language of the simulator SIM by means of the message structure of the communications protocols used and by means of the basic-setting data from the data sets PROT and BASE. The data about this test case is then sent to the simulator SIM, where it is stored in the data set CASE. In response to a request from the operating facility SERV or the control device CONTR2, mapping back is initiated. The data from the data set CASE is sent to the translating device DECOMP, which then performs the mapping back by means of the data from the data sets SZ, PROT, and BASE.

While in the embodiment of the invention the testing of one network component has been described, it is to be understood that the invention can also be used analogously to the embodiment to test the interplay of two or more network components which are all connected to a test set according to the invention.

Similarly, although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A method of testing at least one first device (NETKOMP) wherein the first device (NETKOMP) is connected to a simulator (SIM) which simulates at least one second device according to a test case stored in a second data set (CASE), and wherein the simulator (SIM) sends messages to the first device (NETKOMP) according to the test case, receives reply messages from the first device (NETKOMP), and stores them in the second data set, characterized in that a test is stored in advance as an abstract test scenario in a first data set (SZ), that to generate the test case, the first data set (SZ) is mapped to the second data set (CASE) by means of message-structure data and by insertion of basic-setting data, and that for evaluation, the second data set (CASE) is mapped back to the first data set (SZ) by data reduction.

2. A method as claimed in claim 1, characterized in that the basic-setting data are assigned to message-structure positions, that for the mapping of the first data set (SZ) to the second data set (CASE), the abstract test scenario is mapped to a plurality of message-structure positions (POS11 to POS34), and that the basic-setting data assigned to said message-structure positions (POS11 to POS34) are determined.

3. A method as claimed in claim 2, characterized in that the message structure corresponds to a tree structure.

4. A method as claimed in claim 1, characterized in that for the mapping of the second data set (CASE) back to the first data set (SZ), the reply messages are mapped to message-structure positions (POS11 to POS34) using the abstract test scenario.

5. A method as claimed in claim 4, characterized in that the message structure corresponds to a tree structure.

6. A method as claimed in claim 1, characterized in that the abstract test scenario is generated in a locally selectable abstraction depth and stored in the first data set (SZ) by means of an operating facility (SERV).

7. A method as claimed in claim 1, characterized in that the abstract test scenario is mapped back in an abstraction depth differing locally from that of the abstract test scenario if differences between the abstract test scenario and the test scenario being mapped back are detected.

8. A method as claimed in claim 1, characterized in that the second data set (CASE) is mapped back to the first data set (SZ) on request.

9. A method as claimed in claim 1, characterized in that the second data set (CASE) is mapped back to the first data set (SZ) in response to reply messages received from the first device (NETKOMP).

10. A converter (KONV) for testing at least one first device (NETKOMP) by means of a simulator (SIM) designed to simulate at least one second device according to a test case stored in a second data set (CASE), characterized in that the converter (KONV) is provided with a memory device (MEM1), with a mapping device (DEP), and with an operating facility (SERV) for entering data into the memory device (MEM1) and extracting data therefrom, that the memory device (MEM1) contains a first data set (SZ) about an abstract test scenario, a basic-setting data set (BASE), and a message-structure data set (PROT), and that the mapping device (DEP) is designed to map, in response to a first control instruction, the first data set (SZ) to the second data set (CASE) by means of data from the message-structure data set (PROT) and by insertion of data from the basic-setting data set (BASE), and to map, in response to a second control instruction, the second data set (CASE) back to the first data set (SZ) by data reduction.

11. A converter (KONV) as claimed in claim 10, characterized in that the mapping device (DEP) includes means for connecting different simulators (SIM) thereto.

12. A test set (TEST) for testing at least one first device (NETKOMP) connected thereto, the test set (TEST) comprising a simulator (SIM) designed to simulate at least one second device according to a test case stored in a second data set (CASE), characterized in that the test set (TEST) further comprises a converter (KONV) which is provided with a memory device (MEM1), with a mapping device (DEP), and with an operating facility (SERV) for entering data into the memory device (MEM1) and extracting data therefrom, that the memory device (MEM1) contains a first data set (SZ) about an abstract test scenario, a basic-setting data set (BASE), and a message-structure data set (PROT), and that the mapping device (DEP) is designed to map, in response to a first control instruction, the first data set (SZ) to the second data set (CASE) by means of data from the message-structure data set (PROT) and by insertion of data from the basic-setting data set (BASE), and to map, in response to a second control instruction, the second data set (CASE) back to the first data set (SZ) by data reduction.

13. A test set (TEST) as claimed in claim 12, characterized in that the test set (TEST) is connected to the first device (NETKOMP) by a plurality of links (CON1 to CON4), and that the simulator (SIM) is designed to simulate one second device per link (CON1 to CON4).

14. A program module for a converter (KONV) for testing at least one first device (NETKOMP) by means of a simulator (SIM) designed to simulate at least one second device according to a test case stored in a second data set (CASE), said program module containing a plurality of control instructions, characterized in that the control instructions are arranged to control the sequence of operations in the converter (KONV) in such a way that in response to a first request, a first data set (SZ) in which a test is stored as an abstract test scenario is mapped to the second data set (CASE) by means of message-structure data and by insertion of basic-setting data, and that in response to a second request, the second data set (CASE) is mapped back to the first data set (SZ) by data reduction.

\* \* \* \* \*